(12) United States Patent
Arimondi et al.

(10) Patent No.: US 7,779,651 B2
(45) Date of Patent: Aug. 24, 2010

(54) PROCESS FOR MANUFACTURING A MICRO-STRUCTURED OPTICAL FIBRE

(75) Inventors: Marco Arimondi, Pavia (IT); Giacomo Stefano Roba, Monza (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1180 days.

(21) Appl. No.: 10/499,022

(22) PCT Filed: Dec. 21, 2001

(86) PCT No.: PCT/EP01/15261

§ 371 (c)(1),
(2), (4) Date: Nov. 23, 2004

(87) PCT Pub. No.: WO03/053870

PCT Pub. Date: Jul. 3, 2003

(65) Prior Publication Data

US 2005/0072192 A1    Apr. 7, 2005

(51) Int. Cl.
*C03B 37/075*    (2006.01)
(52) U.S. Cl. .......................................... 65/393; 65/395
(58) Field of Classification Search .................. 65/393, 65/395, 412, 439, 440
See application file for complete search history.

(56) References Cited

U.S. PATENT DOCUMENTS

| | | | |
|---|---|---|---|
| 4,514,205 A | 4/1985 | Darcangelo et al. | |
| 4,969,941 A | 11/1990 | Kyoto et al. | |
| 5,073,179 A | 12/1991 | Yoshimura et al. | |
| 5,079,433 A | 1/1992 | Smith | |
| 5,114,338 A | 5/1992 | Tsuchiya et al. | |
| 5,185,020 A | 2/1993 | Satoh et al. | |
| 5,207,814 A | 5/1993 | Cogliati et al. | |
| 5,254,508 A * | 10/1993 | Kirkbir et al. | 65/395 |
| 5,314,515 A | 5/1994 | Cain | |
| 5,316,562 A | 5/1994 | Smithgall et al. | |
| 5,366,527 A | 11/1994 | Amos et al. | |
| 5,449,393 A | 9/1995 | Tsuneishi et al. | |
| 5,551,967 A | 9/1996 | Urruti | |
| 5,802,236 A | 9/1998 | DiGiovanni et al. | |

(Continued)

FOREIGN PATENT DOCUMENTS

EP    0 652 184 A1    5/1995

(Continued)

OTHER PUBLICATIONS

Derwent abstract to JP 62-148333, Suganuma et al., Preparation of Constant Polarization Optical Fiber, Jul. 2, 1987.*

(Continued)

*Primary Examiner*—Steven P Griffin
*Assistant Examiner*—Queenie Dehghan
(74) *Attorney, Agent, or Firm*—Finnegan, Henderson, Farabow, Garrett & Dunner, L.L.P.

(57) ABSTRACT

In a process for manufacturing a micro-structured optical fibre, an intermediate preform is made by forming a sol; pouring the sol in a cylindrical mould including a set of structural generating elements defining internal structural elements of the intermediate preform; transforming the sol into a gel so as to obtain a cylindrical gel body defining the intermediate preform; and removing the cylindrical intermediate preform from the mould.

10 Claims, 5 Drawing Sheets

U.S. PATENT DOCUMENTS

| | | |
|---|---|---|
| 5,922,099 A | 7/1999 | Yoon et al. |
| 6,299,822 B1 | 10/2001 | Yoon et al. |
| 6,467,312 B1 * | 10/2002 | De Hazan et al. ............ 65/395 |
| 2001/0029756 A1 | 10/2001 | Paek et al. |
| 2002/0152771 A1 * | 10/2002 | Bhandarkar et al. .......... 65/395 |
| 2004/0033043 A1 * | 2/2004 | Monro et al. ............... 385/125 |
| 2004/0050110 A1 | 3/2004 | Berkey et al. |
| 2004/0172979 A1 | 9/2004 | Bhandarkar et al. |
| 2005/0072192 A1 | 4/2005 | Arimondi et al. |
| 2005/0172674 A1 | 8/2005 | Oh et al. |
| 2005/0178160 A1 | 8/2005 | Baik et al. |
| 2007/0095107 A1 * | 5/2007 | Solinas et al. ................ 65/393 |

FOREIGN PATENT DOCUMENTS

| | | |
|---|---|---|
| EP | 1 172 339 A1 | 1/2002 |
| EP | 1 199 581 A1 | 4/2002 |
| JP | 62148333 A * | 7/1987 |
| WO | WO 99/00685 | 1/1999 |
| WO | WO 99/09437 | 2/1999 |
| WO | WO 00/60388 | 10/2000 |

OTHER PUBLICATIONS

J.C. Knight et al., "Photonic Band Gap Guidance in Optical Fibres", Science, vol. 282, (1998).

C. Jeffrey Brinker et al., *Sol-Gel Science: The Physics and Chemistry of Sol-Gel Processing*, Academic Press, New York-London, 1990 (6 pages).

* cited by examiner

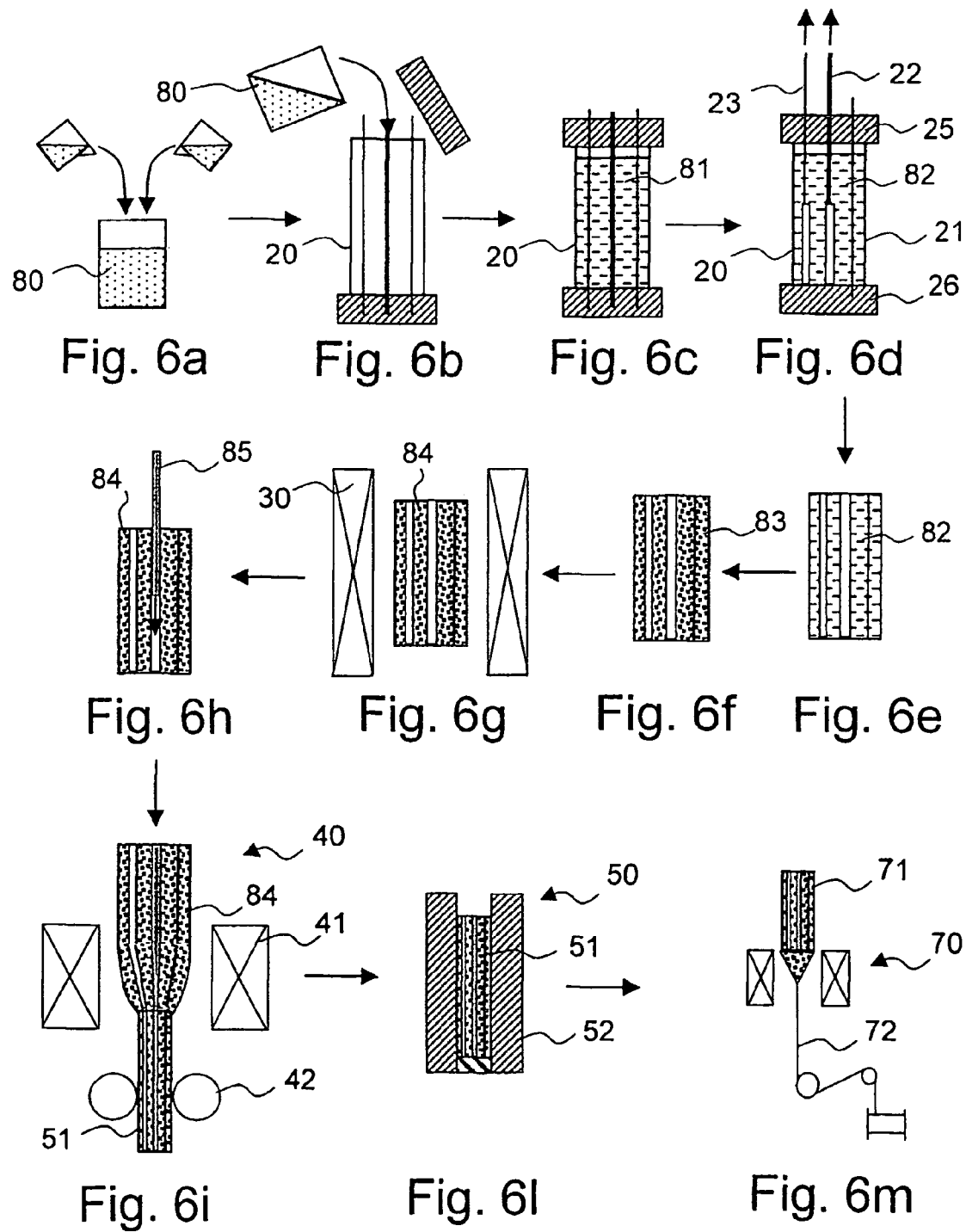

PROCESS FOR MANUFACTURING A MICRO-STRUCTURED OPTICAL FIBRE

CROSS REFERENCE TO RELATED APPLICATIONS

This application is a national phase application based on PCT/EP01/15261, filed Dec. 21, 2001, the content of which is incorporated herein by reference.

BACKGROUND OF THE INVENTION

1. Field of the Invention

This invention relates to a process for manufacturing a micro-structured optical fibre and to a method for producing a structured intermediate preform to be used in such a process.

2. Description of the Related Art

Optical fibres are used for transmitting light from one place to another. Normally, optical fibres are made of more than one material. A first material is used to form a central light-carrying part of the fibre known as the core, while a second material surrounds the first material and forms a part of the fibre known as the cladding. Light can become trapped within the core by total internal reflection at the core/cladding interface.

These conventional fibres are typically produced by well-known vapour deposition techniques, such as MCVD (Modified Chemical Vapor Deposition), OVD (Outside Vapor Deposition) and VAD (Vapor-phase Axial Deposition).

A more recent type of optical fibre waveguide, having a significantly different structure from that of conventional optical fibres, is the micro-structured fibre (also known as "photonic crystal fibre" or "holey fiber"). A micro-structured optical fibre is a fibre made of a same homogeneous material (typically silica), having inside a micro-structure (i.e. a structure on the scale of the optical wavelength) defined by micro-structural elements extending longitudinally along the fibre and having a predetermined distribution. As a micro-structural element it is possible to identify a micro-hole or a filiform element of a different material than the bulk.

The most common type of micro-structured optical fibre has a cladding region showing a plurality of equally-spaced tiny holes, surrounding a homogeneous and uniform central (core) region. A fibre of this type is described, for example, in international patent application WO 99/00685. In a different embodiment, the central region of the fibre may have a central hole, as described, for example, in international patent application WO 00/60388.

These two types of fibres convey light in the core according to different optical phenomena.

In the absence of a central hole, propagation of light in the cladding region is forbidden due to the presence of a lowering of the average refractive index with respect to the core region. Such a structure forms a low-loss all-silica optical waveguide that, for appropriare parameters, remains monomode for all wavelengths within the transmission window of the silica. The waveguiding mechanism in that case is closely related to that in conventional optical fibres and is a form of total internal reflection between two materials (air and silica) having different refractive indexes.

In the presence of a central hole, propagation in the cladding region is forbidden due the presence of a "photonic band-gap". The "photonic band-gap" phenomenon, which is analogous to the "electronic band-gap" known in solid-state physics, avoids light of certain frequencies to propagate in the zone occupied by the array of holes, this light being therefore confined in the core region. Propagation of light in fibres showing a photonic band gap is described, for example, in J. C. Knight, J. Broeng, T. A. Birks and P. St. J. Russell, "Photonic Band Gap Guidance in Optical Fibres", Science 282 1476 (1998)).

Optical characteristics of the above-described micro-structured fibres depend on the number of holes, the holes diameter, the reciprocal distance between adjacent holes and the hole geometrical pattern. Since each of these parameters can broadly vary, fibres of very different characteristics can be designed.

Micro-structured optical fibres are typically manufactured by the so-called "stack-and-draw" method, wherein an array of silica rods and/or tubes are stacked in a close-packed arrangement to form a prefom, that can be drawn into fibre using a conventional tower setup.

In U.S. Pat. No. 5,802,236A, for example, a core element (e.g., a silica rod) and a multiplicity of capillary tubes (e.g., silica tubes) are provided, and the capillary tubes are arranged as a bundle, with the core element typically in the center of the bundle. The bundle is held together by one or more overclad tubes that are collapsed onto the bundle. The fibre is then drawn from the thus prepared preform.

A different stack-and-draw method is described in the above-cited patent application WO 99/00685, and comprises:
producing a cylindrical rod of fused silica;
drilling a hole centrally along the length of the rod;
milling the outside of the rod to obtain six flats so as to confer to the rod a hexagonal cross section;
drawing the rod into a cane by using a fibre drawing tower;
cutting the cane into the required length;
stacking a plurality of such canes to form a hexagonal array of canes, the cane at the centre (that will define the core of the fibre) having no hole drilled through the center; and
drawing the stack of canes into the final fibre using the fibre drawing tower.

The Applicant has noted that the stack-and-draw manufacturing method has several drawbacks.

The awkwardness of assembling hundreds of very thin canes (defined by rods or tubes), as well as the possible presence of interstitial cavities when stacking and drawing cylindrical canes, may affect dramatically the fibre attenuation by introducing impurities, undesired interfaces and inducing a reshaping or deformation of the starting holes. Other problems of the stack-and-draw method may be represented by the low purity of the tubes and/or rods materials and by the difficulties in producing tubes and/or rods of the required shapes (in particular, in the case of hexagonal bodies) and dimensions and in obtaining the required pattern of holes (due for example to the difficulty in realizing geometries different from triangular when positioning rods and tubes in close-packed arrangement). Moreover, the relatively low productivity and high cost make this method not much suitable for industrial production.

A further drawback of the stack-and-draw method, described for example in US 2001/0029756, is that the outer air holes of the fibre are typically closed or are much smaller than the inner air holes. Hence, during the drawing of an optical fibre from the preform, relatively large inner air holes are transformed to an oval shape since the outer glass tubes are melted faster than the inner glass tubes due to the difference in the heat conductivity between the inner portion and the outer portion of the optical fibre preform. This type of distortion in the air holes makes the continuous mass production of holey optical fibres very difficult.

To solve the above problem, US 2001/0029756 proposes, instead of arranging the plurality of glass tubes as in the conventional stack-and-draw method, to vertically arrange the plurality of glass tubes in a gel to prevent the distortion of air holes during the drawing step of the optical fibre. In more detail, US 2001/0029756 proposes the following method for fabricating a holey optical fibre. A sol is first formed by mixing a starting material, deionized water and an additive. The sol is filled into a circular frame and gelled, and a preform rod is inserted into the center of the resulting gel. Meanwhile, a plurality of glass tubes is vertically arranged around the preform rod in the gel. Then, the gel is removed from the circular frame and dried. The dry gel is glassified through a heat application during the sintering process. Thereafter, the holey optical fibre is drawn from the holey optical fibre preform resulting from the sintering process by supplying gas into the ends of the air holes in the holey optical fibre preform while heating the other ends of the air holes, thereby preventing distorsion of air holes.

The Applicant observes that the method for fabricating a holey optical fibre proposed by US 2001/0029756 has the drawback that the holes and the core dimensions in the final fibre are limited by the inner and outer diameter of the tubes and rod employed in the assembly, which is also one of the limits of the conventional stack-and-draw method previously described.

Accordingly, the Applicant has tackled the problem of providing a process for manufacturing a micro-structured optical fibre that overcomes the above-mentioned problems of the known techniques.

SUMMARY OF THE INVENTION

The Applicant has found that, by transforming a suitable sol into a gel in a mould containing a predetermined arrangement of removable structure-generating elements (defined by rod-like or tubular members), and then removing the structure-generating elements, it is possible to form a structured gel preform having a predetermined internal pattern of holes, which is suitable to be transformed into a glass preform for producing an optical fibre. One or more of the structure-generating elements, for example a central structure-generating element, may be designed to remain in the preform for modifying the optical or mechanical property thereof. The resulting structured gel preform can then be dried and sintered to obtain a structured glass preform, which can successively be drawn into an optical fibre having the desired microstructure.

According to a first aspect, the present invention relates to a method for forming an intermediate preform for manufacturing an optical fibre, comprising:

forming a sol containing a glass precursor;

pouring the sol in a cylindrical mould including a set of structural generating elements apt to define internal structural elements of the intermediate: preform;

transforming the sol into a gel so as to obtain a cylindrical gel body defining the intermediate preform; and removing the cylindrical intermediate preform from the mould.

Preferably, after transforming the sol into a gel, the method comprises removing at least one of the structural generating elements for forming at least a hole inside the intermediate preform. More preferably, removing at least one of the structural generating elements-comprises removing a plurality of the structural generating elements for forming a predetermined pattern of holes inside the intermediate preform.

Transforming the sol into a gel preferably comprises aging the sol for a predetermined time, while forming a sol preferably comprises mixing at least one glass precursor and water.

The structural generating elements may be rod-like or tubular members. The set of structural generating elements preferably comprises a plurality of structural generating elements arranged around a central axis of the mould. Moreover, the set of structural generating elements may comprise one central structural generating element coaxial to the central axis.

According to a further aspect, the present invention relates to an intermediate preform as obtainable by the method previously described.

According to a further aspect, the present invention relates to a process for manufacturing a micro-structured optical fibre, comprising:

forming an intermediate preform according to the method previously described;

drying the intermediate preform, for example by supercritical drying.

sintering the dried intermediate preform to obtain a glass preform; and structurally modifying the glass preform to obtain the micro-structured optical fibre.

Preferably, forming an intermediate preform comprises forming at least a hole inside the intermediate preform, and the process further comprises, after drying the intermediate preform and before sintering the dried intermediate preform, or after sintering the dried intermediate preform and before structurally modifying the cylindrical glass preform, inserting at least a micro-structural generating element into the at least a hole.

Structurally modifying the glass preform may comprise stretching the glass preform to obtain a core rod and may comprise applying a tubular glass member externally to the core rod to obtain a final preform.

Applying a tubular glass member externally to the core rod may comprise lowering the air pressure between the tubular glass member and the core rod.

Preferably, the core rod has at least a hole and applying a tubular glass member externally to the core rod comprises flowing a hydrogen-free gas into the at least a hole and controlling the pressure of the hydrogen-free gas.

Structurally modifying the glass preform may alternatively comprise depositing glass soot onto the core rod to obtain a final preform and sintering the final prefom.

Structurally modifying the glass preform preferably comprises drawing the final preform to obtain the micro-structured optical fibre.

BRIEF DESCRIPTION OF THE DRAWINGS

Further details may be found in the following description, which refers to the appended figures listed here:

FIGS. 6a to 6m shows schematically the different steps of the process of the present invention.

DETAILED DESCRIPTION OF THE INVENTION

Figure 1A:
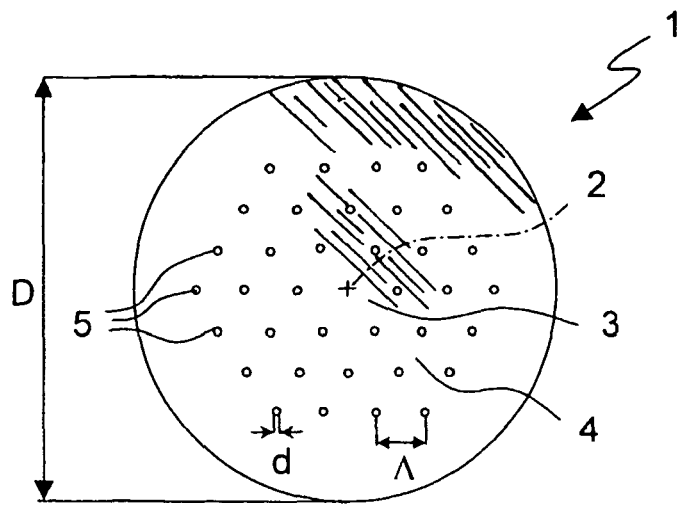
FIGS. 1a, 1b and 1c show three different micro-structured optical fibres.
Figure 1B:
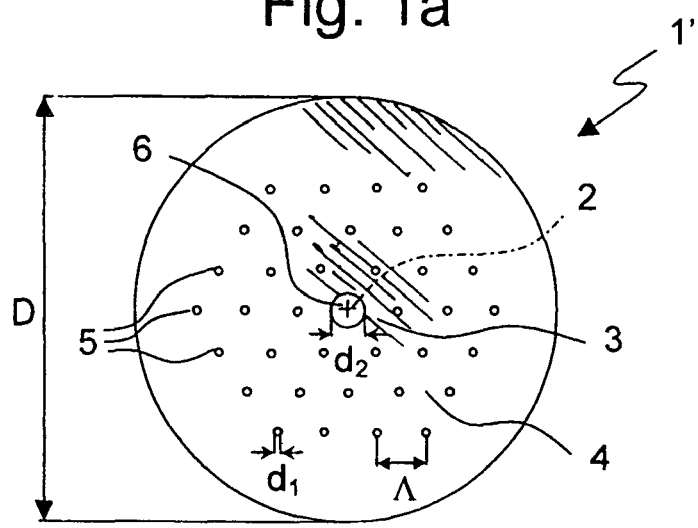
Figure 1C:
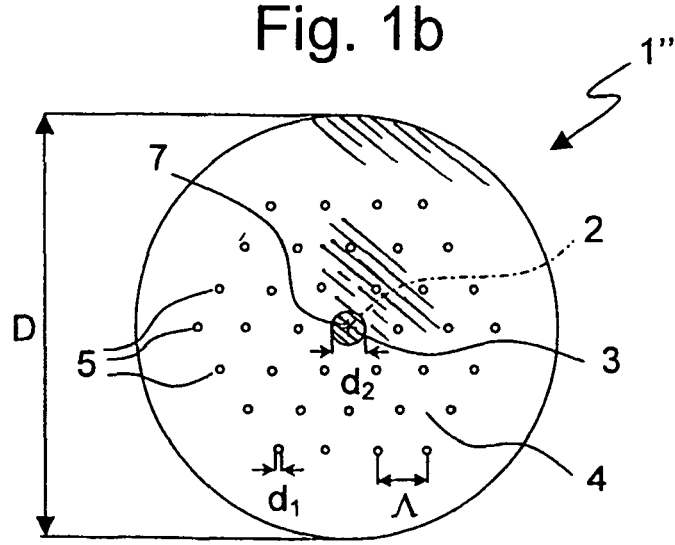

FIGS. 1a to 1c illustrate, as an example, three different micro-structured optical fibres, indicated with 1, 1', 1", respectively, which can be obtained by a process according to the present invention, as described in the following.

Fibre 1 (FIG. 1a) has a central axis 2, a central region 3 coaxial to axis 2 and an annular region 4 surrounding the central region 3. Annular region 4 has a plurality of holes 5, which are preferably arranged symmetrically about axis 2 and have typically the same dimension. Holes 5 may also have different dimensions, for example as illustrated in U.S. Pat. No. 5,802,236, wherein the holes of an inner crown (surrounding the core region) have higher dimensions than the more external holes.

Central region 3 is preferably made, in this embodiment, of the same material as the annular region 4; in particular, central and annular regions 3, 4 are, in this case, different portions of a same homogeneous body (apart from the discontinuity represented by holes 5). Central region 3 is void of holes, thus defining a "central defect" in the holey fibre. Holes 5 may contain air or a different gas, or may be filled with a liquid or with material that is different from that of the hosting glass body. If the holes 5 are filled with a different material, this material will typically have a different refractive index than the surrounding material.

Fibre 1' (FIG. 1b) differs from fibre 1 in that the central region 3 has a central hole 6 coaxial to axis 2, while fibre 1" (FIG. 1c) differs from fibre 1 in that the central region 3 comprises a central micro-structural element 7 of a different material than the material of annular region 4.

Fibres 1, 1' and 1" thus have a plurality of micro-structural elements, which can be defined either by longitudinal holes or by longitudinal portions of a different material than the hosting glass.

The parameters characterizing the above-described micro-structured fibres are the diameter d or $d_1$ of the holes 5, the diameter $d_2$ of the central hole 6 or of the central structural element 7, the spacing (pitch) $\Lambda$ between two adjacent holes 5 and the external diameter D of the fibre. The fibre properties depend, at a chosen light wavelength $\lambda$, on the ratios $d/\Lambda$ and $\Lambda/\lambda$. Typically, the quantities d and $\Lambda$ are in the micron scale and D is, for a standard fibre, 125 µm. The ratio $d/\Lambda$ is preferably comprised between 0.1 and 0.5 and the ratio $\Lambda/\lambda$ is preferably comprised between 0.5 and 10, while the ratio $d/D$ is preferably comprised between 0.004 and 0.08 (a typical value being 1/125).

If the diameter d of holes 5 is a sufficiently small fraction of the pitch $\Lambda$, the core 3 of the fibre 1 guides light in a single mode.

Figure 2:
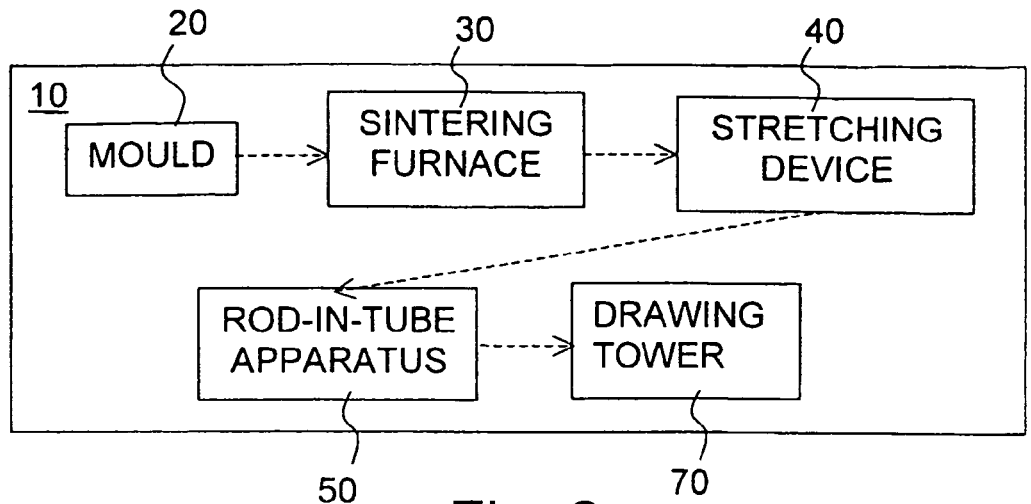
FIG. 2 is a block representation of an assembly for manufacturing a micro-structured optical fibres according to the present invention.

An assembly apt to manufacture micro-structured fibres of the types previously described is schematically depicted in the block representation of FIG. 2 and is here indicated with 10. Assembly 10 comprises a mould 20 for producing a gel core preform from a sol, a furnace 30 for sintering the gel core preform after drying thereof, thus obtaining an intermediate glass core preform, a stretching device 40 for stretching the intermediate glass core preform into a core rod, a rod-in-tube assembly 50 to apply an external cladding to the core rod thus obtaining a final preform, and a drawing tower 70 for drawing an optical fibre from the final preform. A dashed line shows the sequential order of operation of the different components of assembly 10.

Figure 3:
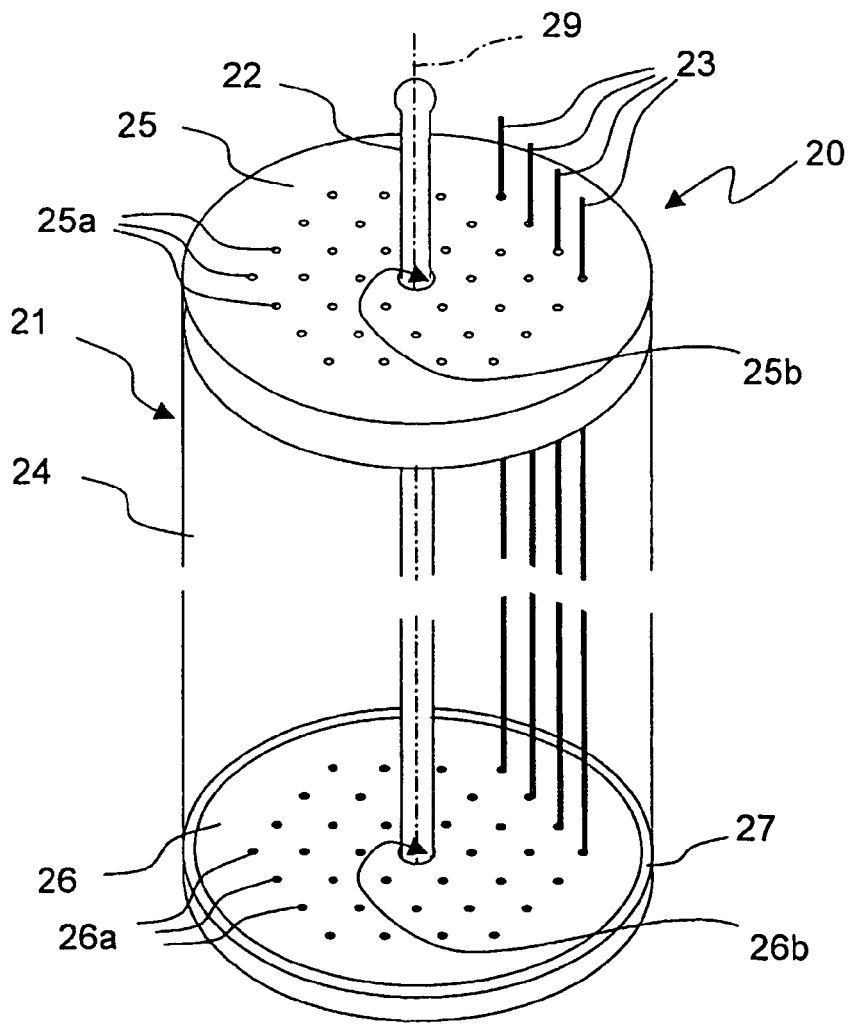
FIG. 3 shows a mould that is part of the assembly of the present invention.

With reference to FIG. 3, mould 20 comprises a cylindrical container 21 wherein the sol will be formed into the gel core preform, and a set of spaced structure-generating elements 22, 23, defined by wires, rods or tubes crossing longitudinally the container 21, for defining the internal structure of the gel core preform. This internal structure of the preform will correspond to the internal microstructure of the final fibre, and the structure-generating elements will therefore referred to as microstructure-generating elements.

Container 21 comprises a cylindrical lateral wall 24 having a central axis 29, and a first and a second cover 25 and 26—lower and upper, respectively—that fit with the extremities of the lateral wall 24 and can be coupled therewith by appropriated means (not shown), for example tie rods and nuts, screw caps or flanged connections. Sealing members 27 may be interposed between the lateral wall 24 and the covers 25, 26, in order to avoid passage of fluids from the internal of the container 21 to the external, or vice versa. The choice of the diameter of container 21 is based on practical considerations of easy handling and processing.

The lateral wall 24 may be a tubular member made of glass, plastic, or metal. Covers 25, 26 may be disk-like members made of PTFE. Upper cover 25 preferably has a central passing hole 25a and a plurality of surrounding passing holes 25b, preferably of smaller dimensions than central hole 25a. Lower cover 26 may have a central recess 26a and a plurality of surrounding recesses 25b arranged as holes 25b. In place of lower cover 26 there may be a base wall integral with lateral wall 24, so as to form a one-piece cup-shaped container. Covers 25, 26 shall be coupled to lateral wall 24 so that the holes of cover 25 are aligned with recesses of cover 26. Means may be provided for easily allowing this alignment, like reference signs or coupling by pins. Preferably, upper cover 25 is relatively thick, so as to provide a guiding function for the microstructure-generating elements 22, 23.

The set of microstructure-generating elements 22, 23 preferably comprises a central microstructure-generating element 22 coaxial to axis 29 and apt to pass through central hole 25a and engage recess 26a, and a plurality of surrounding microstructure-generating element 23, which are preferably of smaller cross-section than central element 22 and are apt to pass through the plurality of surrounding holes 25b and engage recesses 26b. Central microstructure-generating element 22 will be absent if a fibre like fibre 1 of FIG. 1a has to be produced Microstructure-generating elements 22, 23 should have dimensions and rigidity that allow easy handling and easy mould assembly. The surrounding microstructure-generating elements 23 may be identical cylindrical members or may be of different sizes and of different materials.

The materials of microstructure-generating elements 22, 23 should be such that do not corrode in the sol polymerization process and, for those elements designed to be extracted from container 21 as herein below described, that do not damage in the extraction operation. Preferably, the microstructure-generating elements 22, 23 are made of metal, plastic, rubber or glass. The material may also be chosen in accordance with the size of the holes that have to be formed; the choice of the material will moreover determine the technique for removing the elements 22, 23 from the container 21. For example, for holes of relatively small dimensions (up to few mm), elements 22, 23 are preferably rigid elements coated with a non-adhesive substance like PTFE, which can be pulled out by applying some kind of mechanical load, at room temperature. Differently, in the case of holes of relatively large cross-section (several mm or more), elements 22, 23 are preferably made of an elastomeric material, such as rubber, and they can be still be pulled out by applying a mechanical load, at room temperature; in this case, because under tensile stress the diameter of a rubber tube or rod is reduced by a factor related to the Poisson ratio of the material, the risk of damage of the internal surface is limited.

Alternatively (and less preferably) to mechanical extraction techniques, chemical removal techniques can be used. Accordingly, elements 22, 23 may be made of a dissolvable, soluble or low melting point substance. For example, elements may be made of a polymer or paraffin that can be removed by use of a solvent or by melting with a bland thermal treatment. Also elements 22, 23 made of a burnable material (such as a graphite, a polymer, etc.) can be used, so that removal can be accomplished by combustion during the sintering step. In the last case the material may be chosen so as to be resistant to supercritical drying conditions like those described below.

Microstructure-generating elements 22, 23, if required, may be hold straight and in tension by some appropriated means: for example one end thereof can be fixed, and the other one clamped and tensioned with a weight or some mechanical device.

One or more elements of the set of elements 22, 23 may be designed to remain embedded in the preform so as to become a structural element of the preform and, then, a micro-structural element of the fibre. The function of these elements can be optical or mechanical. For example, to produce fibre 1″ of FIG. 1c, the central microstructure-generating elements 22 is designed to remain embedded in the gel structure so as to form the central structural element 7. The elements designed to remain embedded in the preform will be made of predetermined material that is different from the bulk material of the preform and is suitable to stretch when, at the end of the process for manufacturing the fibre, the final preform is drawn into an optical fibre. For example, the central microstructure-generating elements 22 may be a glass rod containing germanium.

The arrangement and the dimension of microstructure-generating elements 23 shall be chosen so as to obtain a predetermined spatial distribution and size of holes in the fibre to be manufactured. In particular, the ratio between the diameter of elements 23 and their reciprocal distance shall correspond to the predetermined ratio $d/\Lambda$ between the diameter d (or $d_1$) of the holes 5 in the final fibre (more in general, of the microstructural elements in the cladding region) and their periodicity $\Lambda$. Differently, the ratio between the diameter of elements 23 and the internal diameter of container 21 shall not necessarily correspond to the ratio $d/D$ between the diameter d of the holes and the external diameter D of the final fibre, and can be chosen according to exigencies of easy handling and processing. In particular, too little dimensions and spacing of the holes make mould assembly very difficult, whereas a too large mould diameter complicates preform post-processing and is likely to cause scrap.

It is evident that a mould as previously described allows for total freedom in the design of the microstructure, and does not generate the undesired interfaces typical in the stack-and-draw method. Moreover, it can be accurately cleaned and isolated from external ambient, so as to reduce causes of optical scattering. As a further advantage, the assembly of the mould is much easier and faster than the stacking of canes, and it requires much less elements.

Modifications and variations of the mould structure are possible, for example by providing one or more microstructure-generating elements that are integral with one of the two covers.

The process of producing a gel preform by mould 20, together with a successive process of transformation of the gel preform into an aerogel preform, will be described in the following.

The sintering furnace 30 is apt to sintering the aerogel preform to obtain an intermediate glass core preform. Sintering furnace can be any furnace known in the art suitable to sintering a gel preform into a glass preform, in particular any furnace suitable to generate a time-variable temperature ranging at least up to 1300° in an atmosphere of helium and/or chlorine gas.

The stretching device 40 is apt to stretch the intermediate glass preform to obtain a core rod of a predetermined diameter and can be any stretching device known in the art that is apt to stretch a glass preform.

Figure 4:
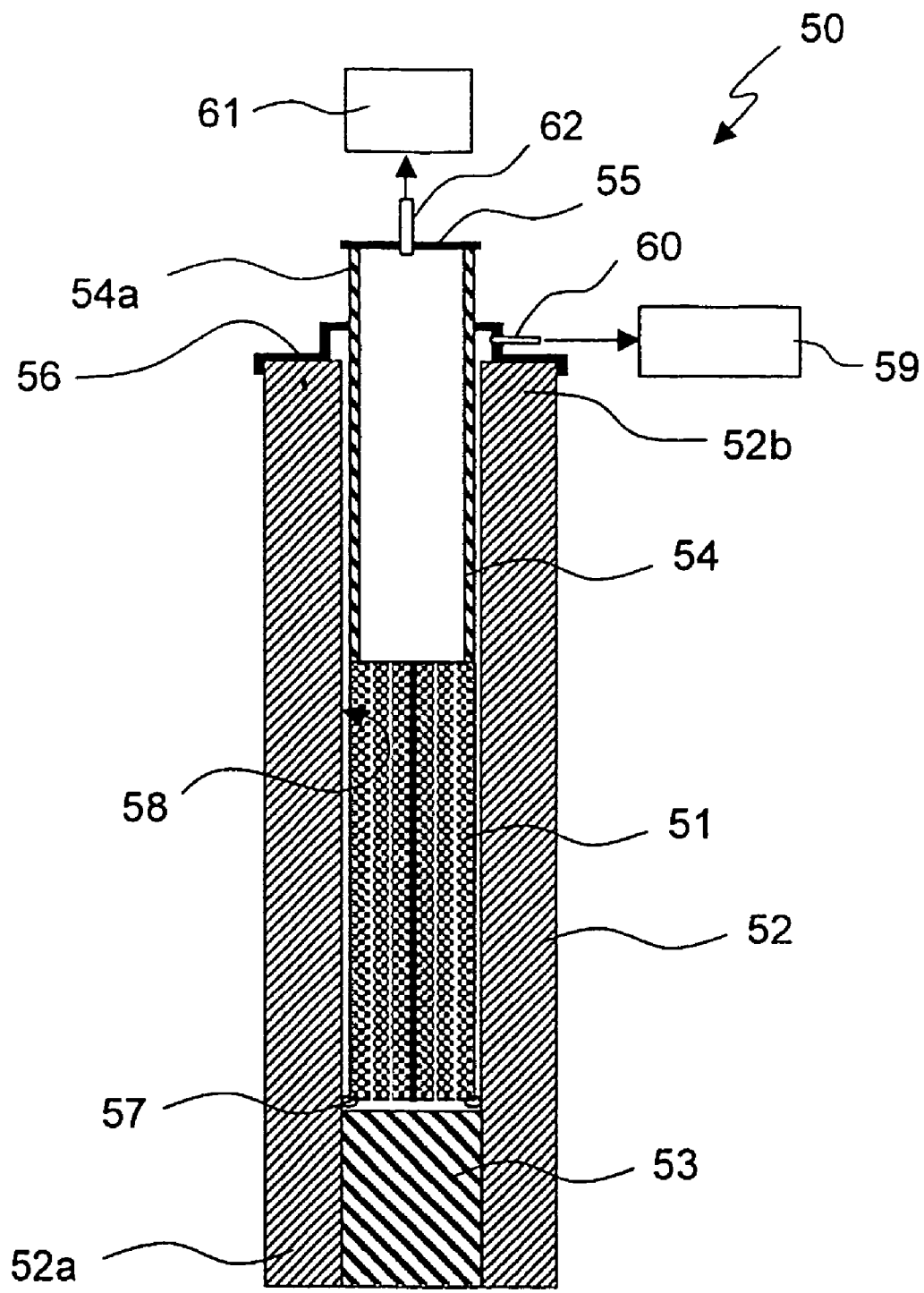
FIG. 4 shows a rod-in-tube assembly that is part of the assembly of the present invention.

With reference to FIG. 4, rod-in-tube assembly 50 is apt to apply onto the core rod, here indicated with 51, a previously realized tubular body 52 made of glass, which will define the external portion of the final preform. Tubular body 52 contains, in a first end portion 52a thereof, a starting rod 53 made of glass, which fits internally with the tubular body 52 and is designed to form the "neckdown" portion of the final preform at the beginning of the drawing process. Preferably, rod-in-tube assembly 50 is made to operate vertically, with the first end portion 52a and starting rod 53 defining a lower portion of the assembly.

Assembly 50 comprises a tubular body 54 defining a preform handling and supplying member. Preform handling and supplying member 54 is preferably made of glass and is apt to be coupled to one end of the core rod 51 by welding. Handling and supplying member 54 allows an easy handling of core rod 51 for insertion of core rod 51 into tubular body 52 through a second (upper) end portion 52b thereof at the beginning of the rod-in-tube process that will be described later. Member 54 preferably has the same external diameter of core rod 51. One end 54a of handling and supplying member 54 is designed to remain outside the tubular body 52 during the rod-in-tube process and is provided on top with a lid 55.

A cup-shaped enclosure member 56, having a central hole with substantially the same diameter of handling and supplying member 54, is apt to be coupled to end portion 52b of tubular body 52 and to be passed through by handling and supplying member 54 when core rod 51 is inside tubular body 52. The external edge of the enclosure member 56 may be bent at 90° so as to form a L-section portion that fits with the circular corner of end portion 52b.

Enclosure member 56 delimits, together with an annular portion of melted glass 57 realized between tubular body 52 and core rod 51 close to starting rod 53, a chamber 58 wherein low pressure or vacuum can be created so as to cause the tubular body 52 to collapse onto core rod 51 during the drawing process (as taught, for example, in international patent application WO 99/09437). Accordingly, apparatus 50 comprises a vacuum generation system 59 of a known type, suitable to pump out air from chamber 58 via an outlet 60 provided in the enclosure member 56, so that air pressure inside chamber 58 can be set lower than 1 Bar.

Preferably, apparatus 50 further comprises a pressure control device 61, which is in fluid communication with the longitudinal holes of core rod 51 via an air passage 62 realized in the lid 55 and via the cavity inside the handling and supplying member 54, and which comprises gas pump means for pumping into said longitudinal holes a hydrogen-free gas apt to remove the hydrogen therefrom, and pressure controlling means for controlling the pressure of this gas, in particular for setting a pressure that is over 1 Bar.

As will be described later, having a pressure lower than 1 Bar inside chamber 58 allows tubular body 52 to collapse onto core rod 51 during the fibre drawing process, while having a pressure over 1 Bar inside the holes of core rod 51 allows said holes to maintain substantially the original shape while thinning during the fibre drawing process. Alternatively, collapsing the tubular body 52 onto core rod 51 may be performed in a separate step before drawing, for example by using an appropriate furnace.

An alternative embodiment may be provided in the case of holes of different dimensions inside core rod 51. In this case, different pressures may be conveniently set into the different-size holes. Accordingly, in substitution of (or in addition to) lid 55, a cover (not shown) may be provided on top of core rod 51, with a set of holes in correspondent positions with the holes of core rod 51, for allowing fluid communication (for example via respective pipes) of pressure control device 61 with said holes.

Figure 5:
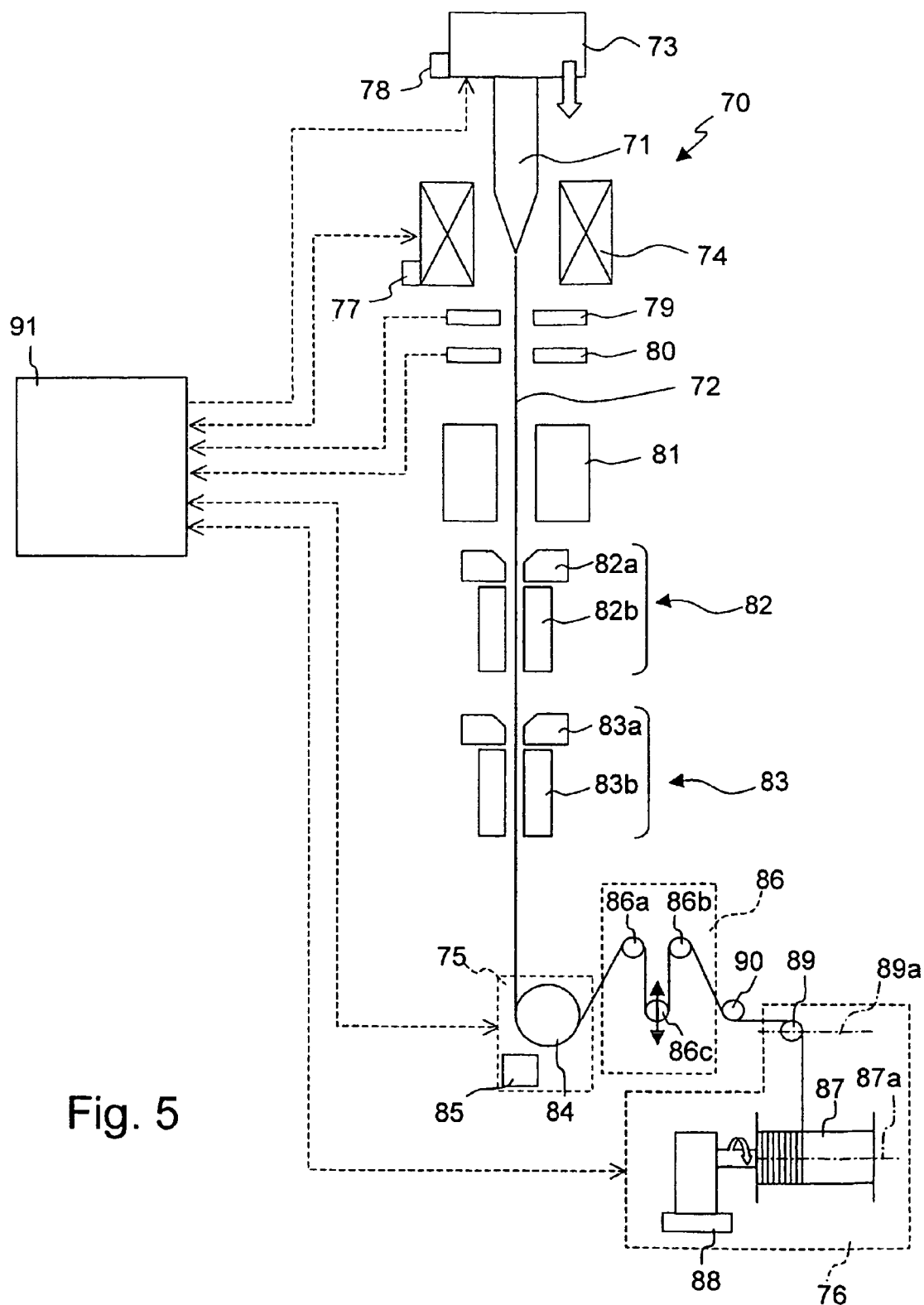
FIG. 5 illustrates a drawing tower that is part of the assembly of the present invention.

With reference to FIG. 5, drawing tower 70 comprises a plurality of components that are substantially aligned in a vertical drawing direction (whence the term "tower"). The choice of a vertical direction in order to perform the main steps of the drawing process arises from the need to exploit the gravitational force so as to obtain, from the final glass preform 71, molten material from which a fibre 72 can be drawn.

In detail, the tower 70 comprises a device 73 for supporting and supplying the preform 71, a furnace 74 for performing a controlled melting of a lower portion of the preform 71, a traction device 75 for pulling the fibre 72 from the preform 71 and a device 76 for winding the fibre 72.

The furnace 74 may be of any type designed to produce the controlled melting of a preform. Examples of furnaces that can be used in the tower 70 are described in U.S. Pat. Nos. 4,969,941 and 5,114,338. The furnace 74 may be provided with a temperature sensor 77 designed to generate a signal indicative of the temperature inside the furnace 74.

Moreover, support device 73 may comprise a preform position sensor 78, providing a signal indicative of the normalized longitudinal coordinate z of the portion of the preform 71 that is melting in that instant.

A tension-monitoring device 79, designed to generate a signal indicating the tension of the fibre 72, may be provided underneath the furnace 74, or in any other position between furnace 74 and traction device 75. The monitoring device 79 may be, for example, of the type described in U.S. Pat. No. 5,316,562 or of the type described in U.S. Pat. No. 5,079,433.

Drawing tower 70 may further comprise a diameter sensor 80 of a known type, positioned underneath monitoring device 79 in the particular embodiment here described, which is designed to generate a signal indicating the diameter of the fibre 72 without any coatings. Preferably, the diameter sensor 80 also performs the function of a surface defect detector, detecting defects in the glass of the fibre 72, such as bubbles or inclusions. The diameter sensor 80 may be, for example, of the interferometric type. This type of sensor is designed, in particular, to generate a first signal proportional to the difference between the detected diameter value and a predefined diameter value, and a second signal indicating the presence of any surface defects.

A cooling device 81 may be situated underneath the furnace 74 and the diameter sensor 80 and may, for example, be of a type having a cooling cavity designed to be passed through by a flow of cooling gas. The cooling device 81 is arranged coaxially with respect to the drawing direction, so that the fibre 72 leaving the furnace 74 can pass it through. The cooling device 81 may be, for example, of the type described in U.S. Pat. No. 5,314,515 or of the type described in U.S. Pat. No. 4,514,205. The cooling device 81 may be provided with a temperature sensor (not shown) designed to provide an indication of the temperature in the cooling cavity. Since the speeds at which an optical fibre is drawn are usually relatively high, the cooling device 81 must allow rapid cooling of the fibre 72 to a temperature suitable for the successive processing steps and, in particular, suitable for the surface coating described below.

Preferably, tower 70 further comprises a first and a second coating device 82, 83, positioned underneath the cooling device 81 in the vertical drawing direction and designed to deposit onto the fibre 72, as it passes through, a first protective coating and, respectively, a second protective coating overlapping the first one. Each coating device 82, 83 comprises, in particular, a respective application unit 82a, 83a which is designed to apply onto fibre 72 a predefined quantity of resin, and a respective curing unit 82b, 83b, for example a UV-lamp oven, for curing the resin, thus providing a stable coating. The coating devices 82, 83 may be, for example, of the type described in U.S. Pat. No. 5,366,527 and may be more or less than two, depending on the number of protective coatings that are to be formed on the fibre 72.

The traction device 75 is positioned underneath coating devices 82, 83 and is preferably of the single pulley or double pulley type. In the illustrated embodiment, the traction device 75 comprises a single motor-driven pulley 84 that is designed to draw the fibre 72 in the vertical drawing direction. The traction device 75 may be provided with an angular velocity sensor 85 that is designed to generate a signal indicating the angular velocity of the pulley 84 during its operation. The speed of rotation of the pulley 84 and, therefore, the drawing speed of the fibre 72, may be varied during the drawing process.

In the case where, during the drawing process, undesired variations in the diameter of the fibre 72 occur, the signal of the diameter sensor 80 may be used to vary automatically the drawing speed of the fibre 72 so as to have again the predefined diameter value. In practice, if the diameter is reduced to below a predefined threshold, the drawing speed is decreased by an amount proportional to the reduction in diameter, while if the diameter is increased above a further predefined threshold, the drawing speed is increased by an amount proportional to the increase in diameter. Examples of the use of diameter sensor signals and surface defect sensors are provided by U.S. Pat. Nos. 5,551,967, 5,449,393 and 5,073,179. The number and the arrangement of the diameter sensors and surface defect sensors may be different from those indicated.

Tower 70 may also comprise a device 86 for adjusting the tension of the fibre 72 downstream the traction device 75. Device 86 is designed to counterbalance any variations in tension of the fibre 72 between pulley 84 and winding device 76. The device 86 comprises, preferably, a first and a second pulley 86a, 86b that are mounted idle and in a fixed position, and a third pulley 86c which is free to move vertically, under the action of its own weight and the tension of the fibre 72. In practice, pulley 86c is raised if there is an undesirable increase in the tension of the fibre 72 and is lowered if there is an undesirable decrease in the tension of the fibre 72, so as to keep the said tension constant. The pulley 37c may be provided with a vertical position sensor (not shown) that is designed to generate a signal indicating the vertical position of the pulley 86c and therefore indicating the tension of the fibre 72.

Winding device 76 comprises a reel 87 and a motorized device 88 for supporting and moving the reel 87. The reel 87 has an axis 87*a* and defines a cylindrical support surface for the fibre 72. Device 88 is designed to support the reel 87 and to set it into rotation about axis 87*a*.

Winding device 76 also comprises a fibre-feeding pulley 89, which may be mounted on a motorized slide (not shown) movable along an axis 89*a* parallel to the reel axis 87*a*, and which is designed to receive the fibre 72 from the tension-adjusting device 86 and to supply the fibre 72 to the reel 87 in a direction substantially perpendicular to the axis 87*a*. During the process of winding of fibre 72, the controlled movement of pulley 89 allows helical winding of fibre 72 to be performed.

As a possible alternative, pulley 89 may be mounted on a fixed support and reel 87 may be movable in a controlled way along axis 87*a*.

A further pulley 90 may be present in order to guide the fibre 72 from the tension-adjusting device 86 towards the pulley 89*a*. Any other pulleys (or guiding elements of another type) may be used, as required.

A control unit 91 is electrically connected to all the sensors and the detectors present along the tower 70 and to all the components of tower 70 whose operation may be controlled from the outside. Control unit 91 is designed to control the various steps of the drawing process on the basis of the values of pre-set process parameter, of the results of the refractive index measurement previously described and on the basis of the signals generated by the sensors and by the detectors positioned along the tower 70. Exchange of information between unit 91 and the various parts of the tower 70 to which it is connected takes place by means of electronic interfaces (not shown) able to convert the digital signals generated by the said unit 91 into analogue signals (for example electrical voltages) suitable for operating the individual parts, and also to convert the analogue signals received from the sensors and the detectors into digital signals designed to be interpreted by said unit 91.

In particular, the following interfaces may be provided: a first interface associated to furnace 74, allowing control unit 91 both to send a control signal to the furnace 74 so as to control its temperature, and to receive information from the temperature sensor 77; a second interface associated to traction device 75 so as to control the angular velocity of pulley 84, and to receive information from the angular velocity sensor 85 associated with said drawing device 75; and a third interface associated to winding device 76, allowing unit 91 both to send a control signal to motorized device 88, so as to control the speed of rotation and of translation of reel 87, and to receive signals from the angular and linear velocity sensors (not shown) associated with the winding device 76.

A process for manufacturing a micro-structured optical fibre according to the present invention is herein below described with reference to the schematic representation of FIGS. 6*a* to 6*m*.

The process starts (FIG. 6*a*) with the preparation of a liquid precursor, in particular a raw material consisting of an inorganic sol, here indicated with 80. The sol 80 may be obtained by mixing a glass precursor and water; in particular, the sol 80 may be obtained by a chemical reaction implying metal alkoxides and water in an alcoholic solvent. The first reaction is a hydrolysis, which induces the substitution of OR groups linked to silicon by silanol Si—OH groups. These chemical species may react together to form Si—O—Si (siloxane) bonds, which lead to the silica network formation. This phase establishes a 3D network that invades the whole volume of the container. The liquid used as solvent to perform the different chemical reactions in these two syntheses remains within the pores of the solid network.

In a second step (FIG. 6*b*), after having assembled the mould 20, the inorganic sol 80 is poured into mould 20. Sol 80 may be poured through central hole 25*b* before inserting central microstructure-generating member 22, or through an appropriate inlet (not shown) provided on upper cover 25. Structure-generating members 23 may also be inserted into container 21 after pouring the sol, but before sol transformation into gel.

The appropriate temperature and pressure conditions, preferably normal environmental temperature and pressure, are then imposed for the time required for sol to harder and completely transform into a gel body (FIG. 6*c*), here indicated with 81.

As a gel body is formed, the microstructure generating elements 22, 23 are removed from the container 21 (FIG. 6*d*) so as to form the internal structure of said gel body. A subset of the microstructure generating elements 22 may remain embedded in the gel body, if they are designed to be form into microstructural portions of the fibre. In particular, central microstructure-generating element 22, if provided, may be removed (together with elements 23) or may remain embedded in the gel body, depending whether a fibre as in FIG. 1*b* or as in FIG. 1*c* has to be produced. When a microstructure-generating element 22 or 23 is extracted, a hole of the same size and geometry is generated in the gel body. The result of this last step is a gel core preform 82 having a predetermined internal structure.

This gel preform 82 is then extracted from the container 21 (FIG. 6*e*). In particular, covers 25 and 26 are separated from lateral wall 24, and gel preform is extracted from lateral wall 24.

The gel core preform 82 is then transformed into an aerogel core preform 83 (FIG. 6*f*), by removing the solvent from the pores of the gel material, which could cause cracking. The process of transforming gel into aerogel can comprise ageing, solvent exchange and supercritical drying. Preferably, the gel is first subjected to solvent exchange, and then drying by thermal treatment in supercritical conditions for the solvent is performed. A process for transforming a gel into an aerogel is described, for example, in U.S. Pat. No. 5,207,814.

The aerogel core preform 83 may then be sintered in the sintering furnace 30, so as to obtain an intermediate glass core preform 84 (FIG. 6*g*) having the same ratio between holes diameter and preform external diameter. Sintering preferably comprises a thermal treatment for the consolidation of the aerogel, in the presence of suitable gases, such as oxygen, chlorine and helium, for removing organic residues and water. Thermal treatment is preferably performed at a temperature that varies so as to perform oxidation of organic residuals in the aerogel, dehydration to remove water and, finally, consolidation of the aerogel.

One or more further structural elements, if required, can be inserted at this stage in the holes previously made in the intermediate core preform (for instance a glassy core rod 85 having a different refractive index) (FIG. 6*h*). Such elements, as the ones that remain in the body under formation from the beginning of the process, become structural elements of the preform and, then, micro-structural elements of the fibre.

The function of these elements can be optical or mechanical. In the former case the element has been inserted to vary the optical propagation properties of the final fibre, and it can have a higher or lower refractive index with respect to the bulk. One or more element may be also inserted for varying the optical properties through stress induced optical effects.

This step of inserting further structural elements may alternatively be performed before the step of sintering the preform.

The resulting preform may then be stretched by stretching device 40 to obtain core rod 51 (FIG. 6i). As schematically illustrated, the stretching device 40 may comprise a conventional draw furnace 41 and motor-driven tractors 42 to draw the core rod 51 from the glass preform 84. Stretching, and the successive rod-in-tube process, may be required to obtain a glass body with a predetermined d/D ratio. In fact, since the choice of the dimensions of container 21 and microstructure-generating elements 23 in mould 20 is based on practical consideration of easy handling and processing, the ratio d/D in the core preform may be larger than that needed in the microstructured fibre. However, the dimensional ratio d/Λ is maintained. Therefore, stretching is convenient for a further reduction of the holes diameter.

The stretched core rod 51 is then inserted in a tubular member 52 by the rod-in-tube assembly 50 (FIG. 6l), so as to obtain a structured final preform, having the desired d/D ratio.

Alternatively, the core rod 51 may be subjected to a vapour deposition process, according for example to a OVD method known in the art, for depositing onto the core rod 51 an overcladding layer, thus obtaining the structured final preform.

The last step of the overall process (FIG. 6m) is the drawing of the structured final preform, indicated with 71, by drawing tower 70 for obtaining the microstructured fibre 72.

During drawing, air pressure inside chamber 58 of the final preform can be set lower than 1 Bar by means of vacuum generation system 59 so as to allow tubular body 52 to collapse onto core rod 51, while hydrogen-free gas at a pressure over 1 Bar is pumped into the holes of final preform by means of pressure control device 61 so that the holes can maintain substantially the original shape while thinning during the fibre drawing process.

Alternatively, collapsing the tubular body 52 onto core rod 51 may be performed, as previously stated, in a separate step before drawing, for example by means of an appropriate furnace. The above-described control of air pressure inside chamber 58 can be performed in this step.

As further possible alternatives, the drawing may be performed directly on the intermediate glass core preform 84 (obtained by sintering the aerogel core preform 83) or on the core rod 51.

It will be apparent to those skilled in the art that various modifications and variations can be made to the disclosed embodiment of the present invention without departing from the scope or spirit of the invention.

In particular, some steps of the above-described process may be omitted or may be executed in a different order.

For example, the glass core preform obtained at the end of the sintering step could be directly drawn, thus omitting the steps of stretching and rod-in-tube assembling. Alternatively, this glass core preform could be directly subjected to the rod-in-tube process without being previously stretched.

The following examples relate to the production of different aerogel preforms according to the process of the present invention.

EXAMPLE 1

Micro-structured fibre is manufactured as follows. First, 100 gr of tetraethylortosilicate (TEOS) are stirred for about 30 minutes at room temperature with 300 ml of a 0.01 N solution of hydrochloric acid. The clear solution is then concentrated by using roto-vapor until the elimination of 140 ml of ethanol/water moisture. Then, 58 gr of fumed silica are added to the clear solution. The resulting mixture is vigorously stirred until homogenization and then centrifuged at 1500 rpm for 10 minutes. The pH of the colloidal solution is raised to 3.9 with ammonia solution obtaining a suitable sol for the successive gelation step. The sol is then poured into the mould 20 already assembled with the microstructure generating elements 22, 23. The lateral wall 24 of mould 20 is made of PTFE material. The microstructure-generating elements 23 are stainless steel rods of 3 mm diameter and 250 mm length; the spacing between two elements is 7.5 mm (d/Λ=0.4). The pattern of holes has a hexagonal shape and is like the one represented in FIG. 1a. Gelation of the sol occurs in few hours. After 12-24 hours a small shrinkage is observed and the microstructure-generating elements can be manually extracted by pulling out them from the mould 20. The gel is then soaked in acetone and later in ethylacetate, which is the liquid used in the further drying step. The drying is carried out in supercritical conditions. For this scope the gel is put into an autoclave of 5 liters of volume, which is then pressurized with nitrogen up to 50 Bar. The heating is then started with a rate of 100° C./hour. The pressure is increased up to 60 Bar and then it is maintained constant acting on a vent valve until the temperature has reached 290° C. At this point the valve is opened and the pressure is decreased with a rate of 7.5 Bar/hour. The autoclave is then cooled down to room temperature. The sample obtained is a structured aerogel preform free from defects or cracks.

EXAMPLE 2

The only difference with respect to Example 1 is represented by the diameter and the spacing of microstructure-generating elements 23: in this case microstructure-generating elements 23 are 1 mm diameter stainless steel wires spaced of 5 mm (d/Λ=0.2). The successive steps are as in Example 1. The sample obtained is a structured aerogel preform free from defects or cracks.

EXAMPLE 3

In this case, the pattern of holes is like the one shown in FIG. 1b. The central microstructure-generating element 22 is a PTFE rod of 6 mm and the microstructure generating elements 23 are 1 mm diameter stainless steel wires spaced of 5 mm ($d_1$/Λ=0.2). The length of the elements is again 250 mm. The successive steps are as in Example 1. The sample obtained is a structured aerogel preform free from defects or cracks.

EXAMPLE 4

The differences with respect to Example 2 are material and dimensions of central microstructure-generating element 22 and spacing of microstructure-generating elements 23: the central microstructure-generating element 22 is a silicone rubber rod of 10 mm and the microstructure-generating elements 23 are spaced of 8 mm ($d_1$/Λ=0.125). When the transformation of sol into gel is over, the microstructure-generating elements 22, 23 are again manually extracted. The sample obtained is a structured aerogel preform free from defects or cracks.

EXAMPLE 5

In this case, the pattern of holes is like the one shown in FIG. 1c. The central microstructure-generating element 22 is a germanium doped silica glass core rod of 5 mm and the microstructure-generating elements 23 are 1 mm diameter stainless steel wires spaced of 5 mm ($d_1$/Λ=0.2). The length of the elements is again 250 mm. Elements 23 are manually extracted while central element 22 is left inside the gel. Further steps are performed as in Example 1. The sample obtained is a structured aerogel preform free from defects or cracks.

EXAMPLE 6

The structured aerogel preforms obtained in the Examples from 1 to 5 are gradually heated in air up to 280° C. at heating rate of 5° C./min; from 280 to 400° C. at 1°C./min; from 400 to 1200° C. at 2° C./min; this temperature is then maintained for 6 hours and finally decreased down to 25° C. The obtained transparent objects are structured core preforms. The dimensions are reduced of about 50%.

EXAMPLE 7

The structured aerogel preforms obtained in the Examples from 1 to 5 are gradually heated in air up to 280° C. at heating rate of 5° C./min; from 280 to 500° C. at 1C/min under a flow of gas containing helium and 4% of oxygen; from 500 to 1° C. at 2° C./min under a flow of chlorine and helium; from 1100 to 1350° C. at 2° C./min under a flow of helium; this temperature is then maintained for 6 hours and finally decreased down to 25° C. The obtained transparent objects are structured core preforms free from hydroxyl group. The dimensions are reduced of about 50%.

EXAMPLE 8

A structured aerogel core preform is manufactured as in the Example 2, by using a mould 20 having an inner diameter of 38 mm. The resulting aerogel preform is consolidated as in Example 7. After consolidation, the core preform has an external diameter of about 18 mm and holes have a diameter of about 0.5 mm. The structured core preform is welded at one end with a tube of 18×20 mm and inserted in a big tube 19×64 mm (rod in tube assembly) as in FIG. 4. The assembled structured preform is then put inside the drawing furnace 74 and vacuum (~0.3 bar) is generated in the chamber 58 between core preform 51 and tubular body 52, while inside the tubular body 52 is maintained a helium atmosphere. A microstructural optical fibre with holes of 1 μm is then obtained by drawing.

EXAMPLE 9

An aerogel preform produced as in the Example 4 is sintered as in Example 7. The central hole is reduced from 10 mm in the gel to 5 mm in the glass. In that hole is inserted a germanium doped silica core rode of 4.8 mm diameter in order to assemble a structured core preform. Such a structured core preform is then mounted in a rod-in-tube apparatus 50 as described in Example 8 and drawn to obtain a microstructured optical fibre.

The invention claimed is:

1. A process for manufacturing a micro-structured optical fibre, comprising:
    forming a sol containing a glass precursor;
    pouring the sol in a mould including a set of structural generating elements defining internal structural elements of an intermediate preform, the structural generating elements being made of rubber;
    transforming the sol into a gel so as to obtain a gel body defining the intermediate preform;
    removing the intermediate preform from the mould;
    applying a mechanical load at room temperature to remove at least one of said structural generating elements, thereby forming at least one hole in the intermediate preform;
    drying the intermediate preform;
    sintering the dried intermediate preform to obtain a glass preform; and
    structurally modifying the glass preform to obtain the micro-structured optical fibre.

2. The process according to claim 1, wherein structurally modifying the glass preform comprises stretching the glass preform to obtain a core rod.

3. The process according to claim 2, wherein structurally modifying the glass preform comprises applying a tubular glass member externally to the core rod to obtain a final preform.

4. The process according to claim 3, wherein applying a tubular glass member externally to the core rod comprises lowering the air pressure between the tubular glass member and the core rod.

5. The process according to claim 3, wherein the core rod has at least one hole, which had been formed previously in the intermediate preform, and wherein applying a tubular glass member externally to the core rod comprises flowing a hydrogen-free gas into said at least one hole of the core rod and controlling the pressure of said hydrogen-free gas.

6. The process according to claim 3, wherein structurally modifying the glass preform comprises drawing the final preform to obtain the micro-structured optical fibre.

7. The process according to claim 2, wherein structurally modifying the glass preform comprises depositing glass soot onto the core rod to obtain a final preform and sintering the final preform.

8. The process according to claim 7, wherein structurally modifying the glass preform comprises drawing the final preform to obtain the micro-structured optical fibre.

9. The process according to claim 1, wherein drying comprises supercritical drying.

10. The process according to claim 1, wherein the process further comprises, after drying the intermediate preform and before sintering the dried intermediate preform, or after sintering the dried intermediate preform and before structurally modifying the glass preform:
    inserting at least one micro-structural generating element into said at least one hole formed in the intermediate preform.

* * * * *